United States Patent
Howitt

(10) Patent No.: US 9,983,092 B2
(45) Date of Patent: May 29, 2018

(54) METHOD AND APPARATUS FOR DETECTING, IDENTIFYING AND LOCATING ANOMALOUS EVENTS WITHIN A PRESSURIZED PIPE NETWORK

(71) Applicant: Ivan Howitt, Charlotte, NC (US)

(72) Inventor: Ivan Howitt, Charlotte, NC (US)

(73) Assignee: INFOSENSE, INC., Charlotte, NC (US)

( * ) Notice: Subject to any disclaimer, the term of this patent is extended or adjusted under 35 U.S.C. 154(b) by 93 days.

(21) Appl. No.: 15/031,057

(22) PCT Filed: Nov. 7, 2014

(86) PCT No.: PCT/US2014/064506
§ 371 (c)(1),
(2) Date: Apr. 21, 2016

(87) PCT Pub. No.: WO2015/073313
PCT Pub. Date: May 21, 2015

(65) Prior Publication Data
US 2016/0252422 A1    Sep. 1, 2016

Related U.S. Application Data

(63) Continuation-in-part of application No. PCT/US2014/052235, filed on Aug. 22, 2014.
(Continued)

(51) Int. Cl.
*G01M 3/24* (2006.01)
*G01M 3/28* (2006.01)
(Continued)

(52) U.S. Cl.
CPC ........... *G01M 3/2807* (2013.01); *E03B 7/071* (2013.01)

(58) Field of Classification Search
CPC ........... G01M 3/16; G01M 3/18; G01M 3/24; G01M 3/26; G01M 3/28; G01M 3/2807;
(Continued)

(56) References Cited

U.S. PATENT DOCUMENTS 6,082,193 A    7/2000  Paulson
7,266,992 B2   9/2007  Shamout et al.
(Continued)

OTHER PUBLICATIONS

Feb. 4, 2015 International Search Report issued in International Patent Application No. PCT/US2014/64506.

*Primary Examiner* — Nguyen Ha
*Assistant Examiner* — 'Wyn' Ha
(74) *Attorney, Agent, or Firm* — Clements Bernard Walker PLLC; Christopher L. Bernard

(57) ABSTRACT

Pipeline networks are ubiquitous for transporting fluids. Failure modes may result in a wide spectrum of negative effects ranging from energy loss to revenue loss to catastrophic failure with loss of life. The present invention introduces innovative technology to detect, identify and locate events representing failure modes and/or precursors to failure modes within a pipeline network. The present invention addresses the issues with the prior art based on the following innovations—exploiting the signal processing enabled by detecting a passive acoustic signal in conjunction with both an active reflected acoustic signal and an active transmitted acoustic signal within a pipeline segment. These measurements can be aggregated to reduce the effects of ambient noise and improve the invention's ability to detect, identify and locate anomalous events representing failure modes and/or precursors to failure modes within a pipeline network.

24 Claims, 9 Drawing Sheets

Related U.S. Application Data

(60) Provisional application No. 61/902,825, filed on Nov. 12, 2013.

(51) Int. Cl.
*G01N 29/00* (2006.01)
*E03B 7/07* (2006.01)

(58) Field of Classification Search
CPC .......... G01N 29/00; G01N 29/14; E03B 7/07; E03B 7/071
See application file for complete search history.

(56) References Cited

U.S. PATENT DOCUMENTS

| | | | |
|---|---|---|---|
| 7,830,273 B2 | 11/2010 | Twitchell | |
| 2008/0314122 A1* | 12/2008 | Hunaidi | G01M 3/243 73/40.5 A |
| 2009/0250125 A1 | 10/2009 | Howitt | |
| 2011/0093220 A1* | 4/2011 | Yang | G01M 3/243 702/51 |
| 2012/0227499 A1* | 9/2012 | Amir | G01M 3/24 73/602 |
| 2012/0312078 A1* | 12/2012 | Bakhtiar | G01N 29/14 73/40.5 A |
| 2013/0211797 A1 | 8/2013 | Scolnicov et al. | |

* cited by examiner

METHOD AND APPARATUS FOR DETECTING, IDENTIFYING AND LOCATING ANOMALOUS EVENTS WITHIN A PRESSURIZED PIPE NETWORK

CROSS-REFERENCE TO RELATED APPLICATION(S)

This application is a U.S. National Stage Entry Under 35 U.S.C. 371 of International Application No. PCT/US2014/64506 filed on Nov. 7, 2014, which is a continuation-in-part of co-pending Patent Cooperation Treat Patent Application No. PCT/US2014/052235, filed on Aug. 22, 2014, and entitled "METHOD AND APPARATUS FOR VALVE POSITION STATE ESTIMATION," and claims the benefit of priority of U.S. Provisional Patent Application No. 61/902,825, filed on Nov. 12, 2013, and entitled "METHOD AND APPARATUS FOR DETECTING, IDENTIFYING AND LOCATING ANOMALOUS EVENTS WITHIN A PRESSURIZED PIPE NETWORK," the contents of both of which are incorporated in full by reference herein.

FIELD OF THE INVENTION

The present invention relates generally to condition assessment within a pipeline or pipeline network which transports fluids and/or gases. More specifically, the present invention detects, identifies and locates anomalous events which are indicative of failure modes and/or precursors to failure modes within a pipeline or pipeline network. The sensors utilize both passive and active acoustic signals.

BACKGROUND OF THE INVENTION

Pipeline networks are ubiquitous for transporting fluids. Whether for the transmission/distribution of gas, oil, water or within an industrial process, pipeline networks play a critical operational role. Failure modes may result in a wide spectrum of negative effects ranging from energy loss to revenue loss to catastrophic failure with loss of life. The present invention introduces innovative technology to detect, identify and locate the following anomalous events representing failure modes and/or precursors to failure modes within a pipeline network:
  Leaks in pipelines
  Tuberculated pipeline sections
  Partially closed or fully closed valve gates
  Variations in fluid homogeneity, e.g., air pockets within a water distribution network
  Pipe wall structural degradation
  Biofilm accumulation
  Deviation from the utility's as-built pipeline network plans, e.g., unknown branches, unknown valves, and/or other unknown structural features.

In evaluating acoustic signal propagation characteristics within a conduit with a gaseous medium, it is usually assumed that the wall motion is negligible and the evaluation can be conducted assuming a rigid waveguide. This assumption may no longer hold when the conduit is used to transport fluids, since the elastic moduli and densities of the conduit wall and the fluid are often of similar magnitudes, making the rigid wall approximation invalid. The present invention utilizes acoustic signals in order to assess a pipeline for anomalous events. As part of this assessment, acoustic signal propagation needs to be characterized within the conduit.

The axisymmetric traveling wave of angular radial frequency, $\omega$, has been evaluated by Del Grosso as reported in Baik [1] and Lafleur [2]. The analytical results provide a method for estimating the axial and radial components of particle displacement at position (r,z) and time t of an acoustic wave within a pipe. To distinguish the modes under the assumptions for this system, e.g., elastic wall with finite thickness, Del Grosso introduced the notation $ET_m$, m=0, 1, 2, . . . , (E indicates elastic wall and T finite thickness). This corresponds to the standard notation for modal analysis $L_{mn}(\bullet)$, with the integers mn identifying the mode of the wave traveling along an axis. Limiting the analysis to axisymmetric, the first integer is zero. Baik [1] and Lafleur [2] extend Del Grosso's work through theoretical development supported with empirical studies. Their results indicate acoustic propagation within a conduit is dependent on a number of factors including: pipe diameter, pipe wall thickness, fluid density, pipe wall density, intrinsic sound velocity in the fluid, and intrinsic radial and axial sound velocity in the pipe wall. Parameter variation has a significant impact on the number of acoustic modes, $ET_m$, supported in the fluid, as well as each supported mode's particle displacement and phase velocity within the fluid.

Additional insight into acoustic propagation is given by Long et. al. [3] where wave propagation in a soil-pipe-water tri-layer system is evaluated based on a model developed by the authors called DISPERSE. The study focuses on using the model to assist in evaluating leak detection based on correlating accelerometer data collected at two water valves. The study results indicate the soil density and its intrinsic radial and axial sound velocity within it can substantially impact the characteristics of the acoustic signal propagation within the pipe's fluid.

Estimating acoustic propagation characteristics within the pipeline being assessed is an important aspect of the present invention. The current art indicates analytical evaluation is complex with significant uncertainty in predicting parameters associated with the evaluation. The present invention utilizes the insight provided by the analytical model and couples this insight with active and passive acoustic measurement results of each pipeline.

Acoustic signals have been extensively used for pipeline assessment [4]. Prior art indicates a general dichotomy for classifying the acoustic based technologies: passive and active. Passive acoustic technologies refer to using a hydrophone and/or accelerometer to detect the presence of acoustic waves indicative of a failure mode. Active acoustic technologies involve using an active signal source to generate an acoustic signal, i.e., an acoustic transmission. The acoustic transmission is used to interrogate the pipeline and the received signal from the transmission is used to detect a failure mode. Active acoustic technologies can be further subdivided as reflective and transmittive. Reflective technologies exploit the reflected transmitted signal, whereas the transmittive technologies exploit the transmitted signal through the pipeline.

The following prior art introduces the use of hydrophone/projectors for acoustic communications within a water distribution network. The technical papers and patents use well established principles in digital communications to provide communications between two or more points within a water distribution network. Acevedo et. al. [5] illustrated acoustic communication between two points within a pressurized water pipe through an experimental setup. Kikossalakis [6] [7] provides a theoretical development and simulation for communication within a pressurized water pipe with a method for powering the system using an energy harvesting technology. Vladimir's [8] invention outlines an in-pipe acoustic communication system for controlling water pressure by transmitting control signals through the pipe via acoustic transmitter and receiver. Martin and Cooper's [9] invention presents a point-to-point acoustic communication system for in-pipe in the frequency range of 3-100 kHz. Cooper and Burnham's [10] invention provides a system for sensing and communicating in a pipeline that contains a fluid. Their invention provides a warning of unauthorized contamination or accidental contamination by sensing and communicating.

The following prior art exploits passive acoustic for leak detection within a fluid filled container. Greene, et al.'s [11] invention provides a system for detecting and mapping acoustic noise intensity in a three-dimensional noise field and uses it to infer operational or performance characteristics. Chana's method and apparatus [12] provide a system of locating leaks within a network of pipes using two or more acoustic sensors with data loggers. The recorded acoustic signals are adjusted for temperature prior to correlations and the signal processing is further enhanced based on extended sound data sets used to reduce noise. Multiple acoustic sensors are used to improve the sound velocity estimate within the pipe. Kurisu, et al.'s system [13] uses pressure sensors to monitor and detect the acoustic wave generated by a breakage or leak within a pipeline. Location is estimated based on correlating the time difference between the event detection times at the sensors. Lander and Saltzstein's methods are based on using multiple acoustic sensors [14] or multiple vibration sensors [15] for detecting and locating acoustic signal caused by leak. Lander extends the use of vibration sensors for monitoring a pipeline network for leaks [16]. Chang's system [17] uses a string of microphones attached to the exterior of a pipeline to detect leaks in the vicinity of the peak response. Savic's system [18] uses multiple acoustic sensors for leak detection. Detection and location estimate is based on using a distributed parameter acoustic model of the buried pipeline based on an autoregressive moving average (ARMA) filter. Suzuki et al.'s system [19] uses an array of vibration signal detectors to detect and locate leaks based on cross correlation. Hunaidi's system [20] detects and locates leaks in plastic water distribution pipes by detecting the acoustic signal induced by the leak measured at two or more locations via vibration sensors or hydrophones. Location is estimated based on a cross-correlation function or an enhanced impulse response function. Bseisu et al.'s system [21] senses both axial and torsional vibrations and pressure fluctuations caused by a leakage event. The location of the leak is determined by comparing the travel time of the selected pairs of both axial and torsional signals. Roberts et al.'s method and apparatus [22] use transducers spaced along a pipe to detect acoustic energy caused by a leak or third party strike. Detecting and locating the source of the leak is based on modal analysis of the received signal and then generalized cross correlation is used on selected modes to identify and locate the source. Yang and Recane's invention [23] uses acoustic sensors to detect and locate an acoustic signal. A matched filter is employed on the received signal in order to reduce false alarms and improve sensitivity for leak detection. Paulson's process and apparatus [24] use acoustic monitoring to indicate possible leak locations; the pipeline is also monitored for temperature. This method correlates acoustics and temperature to detect possible pipeline leaks and their locations. Yang, et al.'s invention [25] correlates acoustic pressure sensor measurements in conjunction with strain gauge measurements to detect and locate leaks in a pipeline. Joel and Pascal provide a method [26] for reducing false alarms for detecting leaks and strikes based on acoustic sensor measurements.

The following prior art exploits passive acoustics for parameter characterization within a fluid filled container. Lapinski, et al.'s invention [27] presents a method and system for determining the direction of fluid flow using one or more acoustic transducers in proximity to a conduit. The characteristics of the acoustic noise sources detected by the acoustic transducers within the conduit are used to determine the direction of flow. Okada et al.'s [28] invention provides monitoring and location estimation for leak and third party strikes based on using multiple acoustic sensors attached to the wall or inserted within the pipe. Detection is based on identifying abnormal acoustic events occurring within the pipe such as leaks or pipe strikes and the event's location is evaluated by using the relative time difference in the arrival of the acoustic signal at the sensors. Russo's invention [29] uses an acoustic signal induced by a leak to detect the event and location within a steam pipe. Worthington and Worthington's system [30] uses multiple hydrophones installed at valve locations to detect and locate sounds emanating from a breaking, moving or re-anchoring reinforcement within a pre-stressed concrete cylinder. Paulson's invention [31] uses an array of acoustic sensors to detect leakage and/or reinforcement wire breaking events within pipes. The sensors are either placed along a cable inside the pipe or are installed at regular intervals along the pipe. Events are located by evaluating time of arrival at multiple sensors. Martinek's invention [32] uses an integrated sensor to measure flow rate and direction, water pressure and flow noise. Multiple sensors are deployed and the data collected are correlated for detecting water losses and leak detection in a water distribution network. Bassim and Nabil's apparatus [33] uses multiple acoustic sensors deployed along a pipeline that detect long term acoustic emissions which are indicative of failure modes. Allison, et al.'s system [34] detects impacts to a pipeline using acoustic detection with hydrophones. Hydrophones directly measure acoustic signals propagated along the pipeline due to impact. Haines and Francini's system [35] detects the contact with an in-ground pipeline via acoustic sensors where each sensor is employed to detect a different parameter. The difference in the travel time between the two parameters is used to determine the location. Dalmazzone, et al.'s system and method [36] use a similar approach as [35], but targets underwater pipelines. Staton and Peck's invention [37] uses both acoustic sensors and seismic sensors to detect drill penetration through a sewer pipe wall during horizontal boring.

The following prior art exploits reflected energy for assessment. Piesinger's [38] invention uses a pseudo noise (PN) modulated electrical signal applied to an electrical distribution network. Reflected energy from the PN signal in conjunction with network knowledge is used in detecting faults within the network. Fink's invention [39] provides a method for evaluating the impulse response in a reflective medium based on using multiple (two or more) transducers to simultaneously excite the medium with orthogonal acoustic signals. Harley's invention [40] discloses a method for examining a body based on transmitting N continuous orthogonal signals into the body. The N signals and reflections are recorded and then used to produce a wavefield and measure travel time, which can be used to characterize changes in the reflective body. Ledeen, et al.'s method and apparatus [41] are a monitoring system which detects and locates a leak in a pipeline. The system is based on first detecting the acoustic signal generated by the leak. The system then uses a co-located pressure transmitter to generate an acoustic wave. The reflected acoustic wave from the leak is used to determine its location. Shamout et al.'s invention [42] is based on using a single acoustic transmitter and one or more acoustic sensors. The reflected signals from the acoustic transmission are used to detect blockages and leaks. A reference signal for the pipe segment under non-leak and non-blockage condition is used to detect abnormalities. The multiple acoustic sensors are used to determine the direction of the reflected signal.

The following prior art exploits active acoustic for parameter characterization within a fluid filled container. Baumoel's system [43] detects and locates leaks using the effect of pressure drop on acoustic signals. An acoustic signal is induced into the pipe wall and within the flow. A leak in the pipe creates an area of low pressure causing the acoustic wave within the flow to be delayed. Hill's invention [44] uses an acoustic pulse in conjunction with an integrated optic fiber for acoustic sensing. The optic fiber is positioned along the path and outside the conduit. A profile of the conduit condition can be derived by monitoring the acoustic signal as it is transmitted through the conduit. Howitt's method and system [45] use an acoustic transmitter and acoustic receiver at either end of a pipeline segment in order to assess the blockage within the pipe.

The following prior art exploits pipeline network analysis based on monitored data. Mizushina et al's method [46] for estimating the location of leaks within pipes is based on measuring flow rates or pressures arranged at multiple points within the pipe network. Peleg et al.'s system and method [47] use utility metering and monitoring data to statistically evaluate water network events including leakage events. Scolnicov et al.'s system and method [48] use event data from multiple sensors in a water network and use the event data to detect and identify related anomalous events. Wakamori et al.'s method [49] estimates the fracture point location(s) in a pipe network based on pressure variations and flow continuity requirements monitored at multiple locations throughout the network. Farmer's system [50] of monitoring for leaks within a pipeline uses statistical analysis based on pressure or flow data collected at multiple locations. In Abhulimen and Susu's method [51] for detecting and locating leaks in a pipeline network, flow models are used to characterize both the steady and unsteady state flow behavior corresponding to absence and presence of modeled leaks, respectively. Liapunov's stability theory is used in evaluating the leak status based on the flow models. Guidi and Tedeschi's method [52] for leak detection is based on statistical analysis of the good state and the bad state estimated by monitoring the input flow rate to the network. Yukawa, et al.'s method [53] for water leakage detection and location estimation is based on flow meter and pressure gauge data integrated with a flow model. Greenlee, et al.'s system and method [54] is based on comparing flow vector models, one based on known conditions and one based on observed flow data. Leak detection is based on the comparison.

In summary, a primary pipeline assessment application is leak detection, which often exploits passive acoustics for detecting the pressure wave generated by the leak. This approach is susceptible to background noise and care needs to be taken to reduce false positives and false negatives. In addition, location estimation requires knowing the intrinsic acoustic velocity within the pipeline. Errors in predicting the velocity within the pipeline will directly impact the location estimation error. Related prior art also provides insight in using reflected acoustic detection from an active acoustic transmission for detecting/locating leaks and blockages. This prior art does not exploit the information stored in the passive detection nor the active transmittive signal through the pipeline. Related art also provides insight into using pipeline network monitoring devices to evaluate and assess water losses within the network. This prior art provides information for identifying areas within the network requiring additional investigation, but are less reliable for identifying specific pipelines and the location on the specific pipeline causing the leak or other anomalous events.

BRIEF SUMMARY OF THE INVENTION

The present invention addresses the issues with the prior art based on the following innovations—the invention exploits the signal processing enabled by detecting the passive acoustic signal in conjunction with both the active reflected acoustic signal and the active transmittive acoustic signal. These measurements can be aggregated to reduce the effects of ambient noise and improve the detection, identification and location of anomalous events representing failure modes and/or precursors to failure modes within a pipeline network. The present invention uses two or more acoustic transducers for evaluating a pipeline or pipeline network. The acoustic transducers are either directly coupled into the fluid transported by the pipeline or attached to the pipeline infrastructure. The transducers are located upstream and downstream from the pipeline segment-under-test. Upon initiating an assessment, the acoustic transducers are operated in passive mode in order to detect an acoustic signal generated by an anomalous event, e.g., leak, and/or ambient acoustic noise. After the passive mode measurement, an active mode is initiated in which one acoustic transducer transmits a structured acoustic signal and the other acoustic transducers receive the transmission which passes through the pipeline segment-under-test. In addition, the reflected signal is also received by the transmitting acoustic transducer. In this fashion, the feature set used to assess the pipeline segment is based on its full two-port analysis. In addition, the passive signal detected is used to enhance the signal processing of the active mode measurements. The pipeline section feature sets collected between multiple deployments of the acoustic transducers can be combined using network theory to further enhance the assessment process.

BRIEF DESCRIPTION OF THE DRAWINGS

The present invention is illustrated and described herein with reference to the various drawings, in which like reference numbers are used to denote like system components/method steps, as appropriate, and in which.

DETAILED DESCRIPTION AND BEST MODE OF THE INVENTION

The Hydro-RAT operation involves a multi-step process for obtaining an assessment for either one or multiple pipeline segments using active (reflective and transmittive) and passive acoustics. The acoustic signal is generated, received, processed and evaluated by the Hydro-RAT Unit (H/RU). Operation of the Hydro-RAT typically requires multiple H/RU units where measurement data are exchanged between the units in order to assess the detection, identification and location of anomalous events within the investigated pipeline network.

Figure 1:
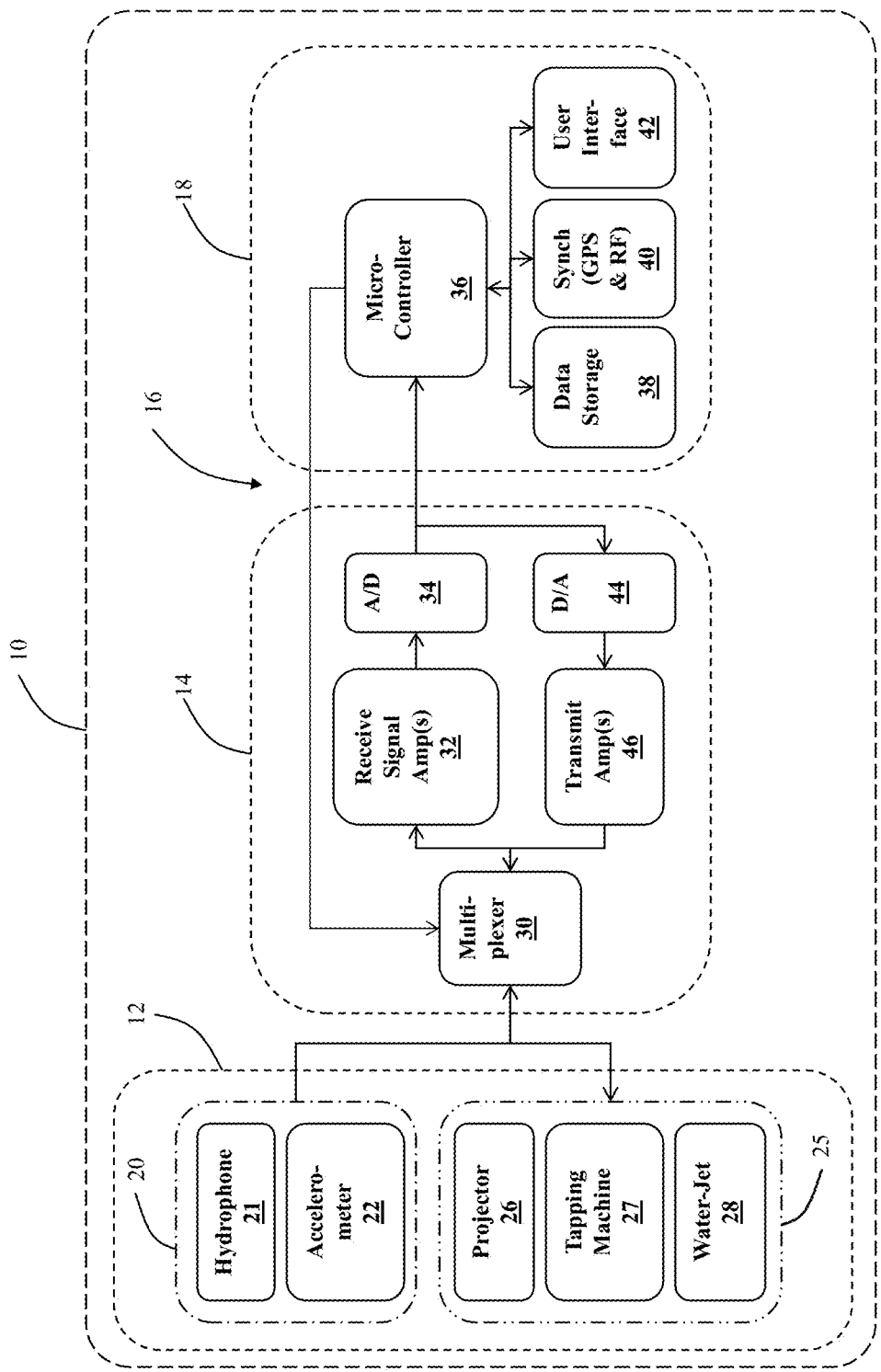
FIG. 1. is a schematic diagram illustrating one exemplary embodiment of the Hydro-RAT Unit (H/RU); the basic building block for the Hydro-Rapid Assessment Tool (Hydro-RAT™).

Referring to FIG. 1, an embodiment of the H/RU 10 is illustrated and is comprised of three major subsystems: the Acoustic Transducer Unit 12, the Signal Processing Unit 14, and the Control, Synchronization and Analysis Unit 18.

Transmitted acoustic signals are generated by the micro-controller 36 either directly generating a structured digital signal or by retrieving a structured digital signal from data storage 38. The structured digital signal is, as an example, a stepped tone sequence, a chirp waveform, a pseudo-random sequence, or an impulse sequence. The structured digital signal is converted to an analog signal 44 and amplified 46. The micro-controller 36 sets the multiplexer 30 to transmit the signal to the portion of the distribution system under test via one of several possible Acoustic Signal Generators (Transmitters) 25: Projector 26, Tapping Machine 27, or Water-Jet 28. An embodiment of the H/RU 10 includes one or more of the Acoustic Signal Generators 25.

An acoustic signal is received through one or more of the Acoustic Sensors 20: Hydrophone 21 and/or Accelerometer 22. The multiplexer 30 is set by the micro-controller 36 to receive analog signals from the corresponding Acoustic Sensor(s) 20. The analog signals are amplified 32 and converted to a digital signal 34. The micro-controller 36 then processes the received digital acoustic signal. The received signal and related data are stored to the data storage component 38. The process is controlled by an operator either locally or remotely via the User Interface 42. One embodiment of the User Interface 42 would include a display, keyboard/keypad, and serial and/or parallel data port such as a USB (universal serial bus) port. An alternative embodiment of the User Interface 42 would include a wireless interface to a handheld, tablet or laptop computer.

The detection, identification and location of anomalous events within the local pipe network require coordination between two or more H/RUs. Time and data synchronization between multiple units is achieved via the Synch subsystem 40. One embodiment for achieving multiple H/RU time synchronization is to use GPS (global positioning system) to provide both UTC time (Coordinated Universal Time) and a synchronization strobe at each unit. In addition, one embodiment for achieving data synchronization between the H/RU units is to use an RF (radio frequency) interface between the units, where the RF interface is based on one of the commercially available wireless technologies or a proprietary wireless design.

The detection, identification and location of anomalous events may use additional information concerning the portion of the water distribution system under test, as an example, the GIS (geographic information system) layout of the water distribution system and/or prior H/RU measurements at the current deployment site and within the local vicinity of the deployment site. This information is obtained from the municipal utility and/or contractor and downloaded to the Data Storage component 38 via the User Interface 42.

Figure 2:
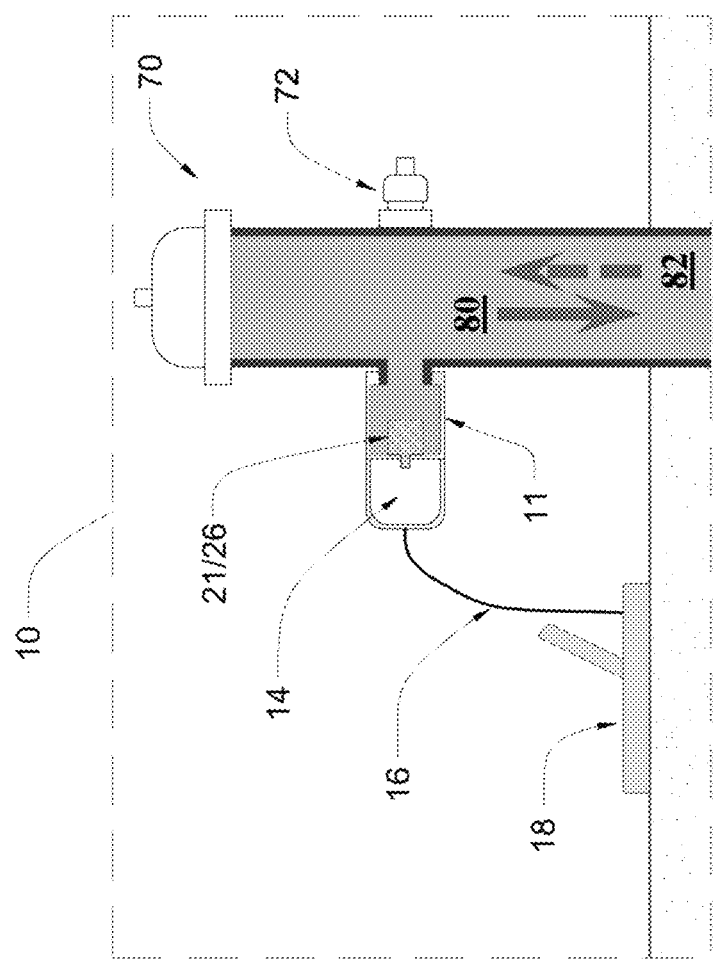
FIG. 2. is a schematic diagram illustrating one exemplary embodiment of an H/RU deployed at a fire hydrant and utilizing a single Acoustic Transducer, i.e., hydrophone/projector.
Figure 3:
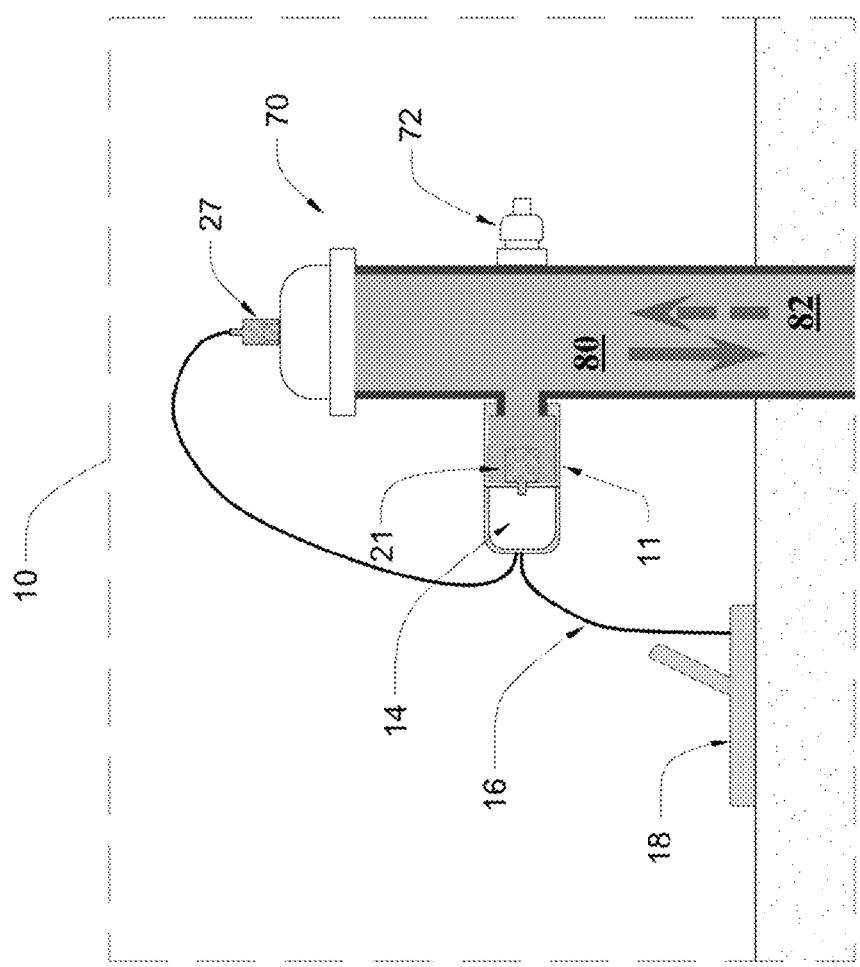
FIG. 3. is a schematic diagram illustrating one exemplary embodiment of an H/RU deployed at a fire hydrant and utilizing a hydrophone as the Acoustic Sensor and a tapping machine as the Acoustic Generator.
Figure 4:
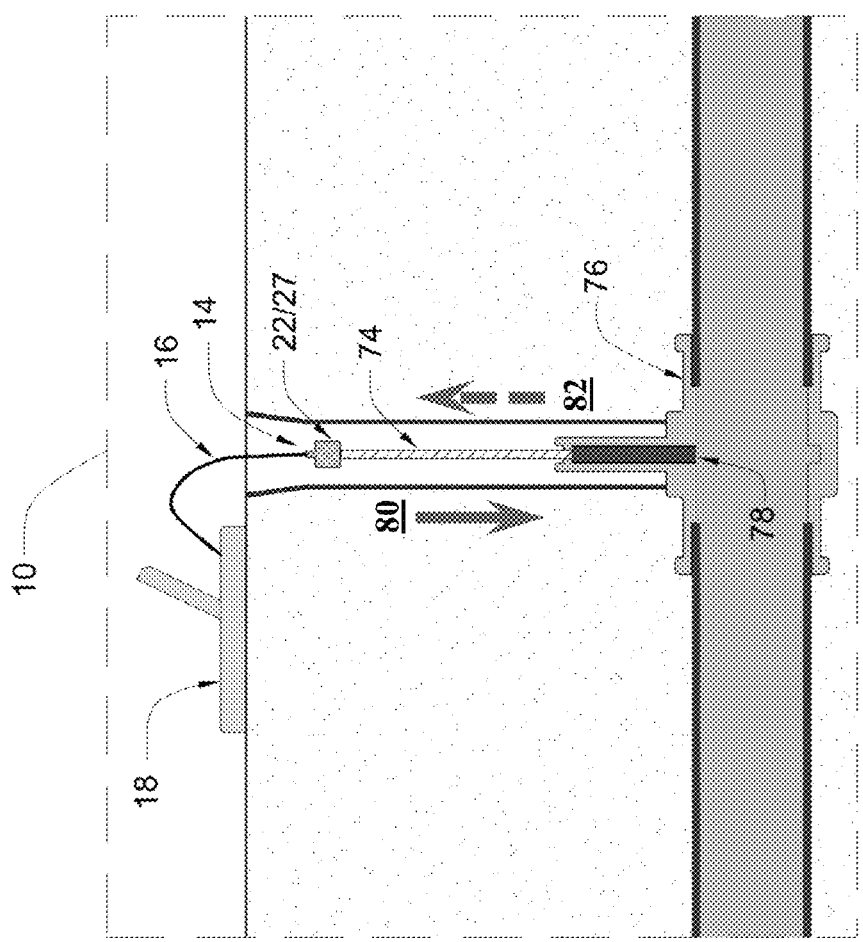
FIG. 4. is a schematic diagram illustrating one exemplary embodiment of an H/RU deployed at an isolation valve and utilizing an accelerometer as the Acoustic Sensor and a tapping machine as the Acoustic Generator.

Referring to FIGS. 2 through 4, embodiments of the H/RU 10 are depicted illustrating three unique deployments from the multiplicity of deployment scenarios. The H/RU embodiment is governed by variations in the Acoustic Transducers 12 utilized and variations in the available deployment sites on the pipe infrastructure, as an example, fire hydrant 70, isolation valve 76, or exposed pipe.

Referring to FIG. 2, the H/RU 10 embodiment utilizes a single Acoustic Transducer Unit 12 to function as both the Acoustic Sensor 20 (Hydrophone 21) and the Acoustic Generator 25 (Projector 26). The Control, Synchronization and Analysis Unit 18 interfaces via a cable 16 or wireless transceiver to the Signal Processing Unit 14. The Signal Processing Unit 14 and the hydrophone 21/projector 26 are contained in a ruggedized fluid-tight housing 11. In this embodiment, the housing 11 allows the H/RU to be connected to a fire hydrant 70 through either one of the two fire hose nozzles 72, standard features on fire hydrants. The Control, Synchronization and Analysis Unit 18 is used to initiate a local pipe network condition assessment, by generating structured acoustic signals 80. The acoustic signals 80 are coupled into the water distribution system through the projector 26. In turn, reflected and received acoustic signals 82 are detected by the hydrophone 21 and are evaluated to look for anomalous events within the local pipe network.

Referring to FIG. 3, the H/RU 10 embodiment utilizes a Hydrophone 21 as the Acoustic Sensor 20 and a Tapping Machine 27 as the Acoustic Generator 25. The Control, Synchronization and Analysis Unit 18 interfaces via a cable 16 or wireless transceiver to the Signal Processing Unit 14. The Signal Processing Unit 14 and the hydrophone 21 are contained in a ruggedized fluid-tight housing 11 connected to a fire hydrant 70 through a fire hose nozzle 72. The Tapping Machine 27 is mechanically attached to the exterior of the fire hydrant 70. The Control, Synchronization and Analysis Unit 18 is used to initiate a local pipe network condition assessment, by generating structured acoustic signals 80. The acoustic signals 80 are coupled into the water distribution system through the Tapping Machine 27. In turn, reflected and received acoustic signals 82 are detected by the hydrophone 21 and are evaluated to look for anomalous events within the local pipe network.

Referring to FIG. 4, the H/RU 10 embodiment utilizes an Accelerometer 22 as the Acoustic Sensor 20 and a Tapping Machine 27 as the Acoustic Generator 25. The Control, Synchronization and Analysis Unit 18 interfaces via a cable 16 or wireless transceiver to the Signal Processing Unit 14. The Signal Processing Unit 14, Accelerometer 22, and Tapping Machine 27 are contained in a ruggedized housing allowing mechanical attachment to the valve stem 74 of the isolation valve 76. The valve stem 74 is used to raise and lower the isolation valve gate 78. The Control, Synchronization and Analysis Unit 18 is used to initiate a local pipe network condition assessment, by generating structured acoustic signals 80. The acoustic signals 80 are coupled into the water distribution system through the Tapping Machine 27. In turn, reflected and received acoustic signals 82 are detected by the accelerometer 22 and are evaluated to look for anomalous events within the local pipe network.

Figure 5:
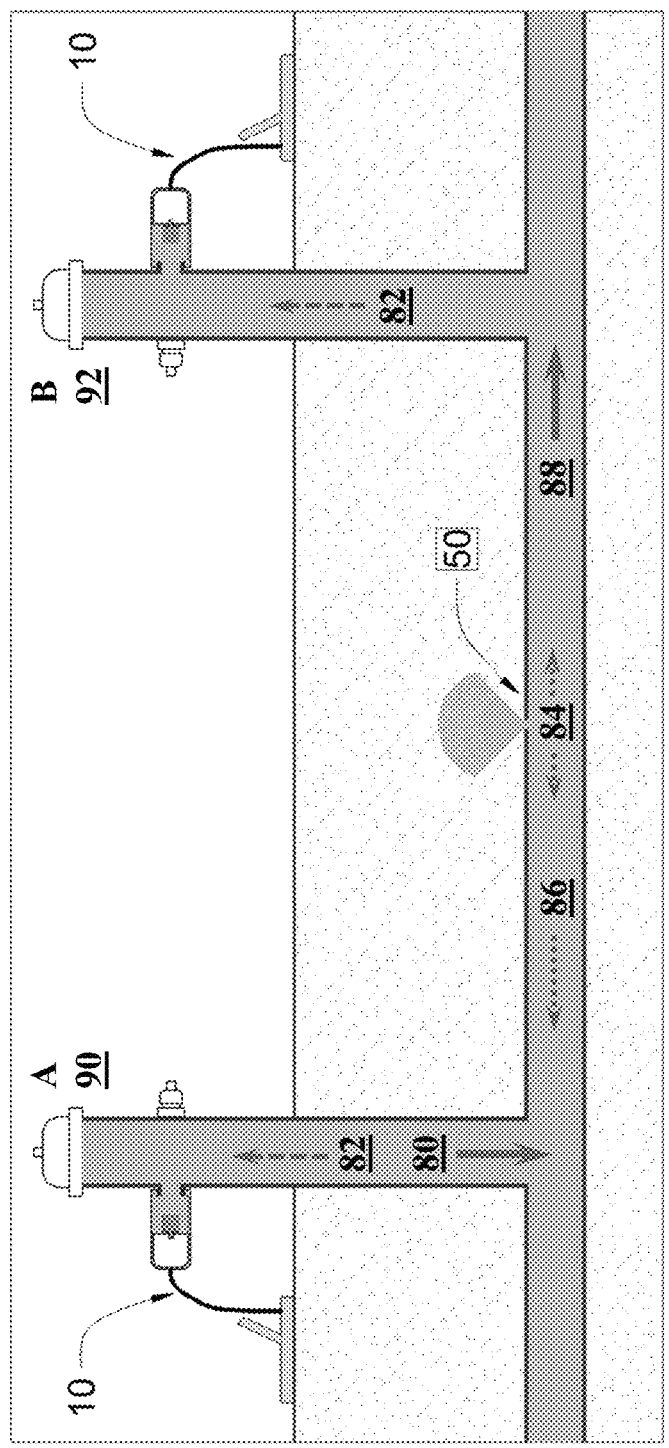
FIG. 5. is a schematic diagram illustrating one exemplary embodiment of the Hydro-RAT deployment for a single pipeline segment based on two H/RUs.

Referring to FIG. 5, a single pipeline segment deployment for the Hydro-RAT is depicted with an H/RU 10 deployed at a fire hydrant 90-A and a second H/RU 10 deployed at a fire hydrant 92-B. The two fire hydrants are on the same water distribution line and the two fire hydrants are within the operational range of the H/RU. As embodied in the figure, there is a break in the pipeline located in-between the two H/RUs deployed. For this discussion, in-between is based on the signal propagation characteristics within the water distribution pipe line network and a water leak due to a pipe break/rupture, which represents one of several possible anomalous events that can be assessed by the technology.

In the embodiment depicted in FIG. 5 two H/RUs are deployed. It is straightforward to extend this operational mode to include additional H/RUs. The additional H/RU measurements enhance assessment under more complex water distribution network geometries potentially involving multiple anomalous events in-between the H/RUs.

For the operational mode depicted in FIG. 5 there are four modalities for assessing the pipeline condition based on the acoustic signal generated by the leak, in addition to the acoustic signal transmission and reflection. The anomalous event embodied in FIG. 5, a pipeline break, generates a leak acoustic signal 84. In addition, due to the pipeline break, the resulting fluid leak causes an impedance mismatch for an acoustic signal traveling within the fluid. The impedance mismatch causes a portion of the acoustic energy traveling within the pipe to be reflected back towards the source and to be transmitted through the anomaly. The characteristics of the reflected and transmitted signal will be related to the nature of the anomalous event. The first acoustic modality is the received signal 82 at the H/RU 10 at location 90-A due to the leak acoustic signal 84 combined with the reflected signal 86. The reflected signal 86 is based on the structured acoustic signal 80 generated at the H/RU 10 at location 90-A. The second acoustic modality is the received signal 82 at the H/RU 10 at location 90-B due to the transmitted signal 88 passing through the pipeline anomaly 50 in combination with the leak acoustic signal 84. The transmitted signal 88 is the portion of the generated acoustic signal 80 which is transmitted through the pipeline anomaly, e.g., the leak as depicted in FIG. 5. The third and fourth acoustic modalities are based on switching the roles of the two H/RUs, i.e., the H/RU at 92-B transmits a structured acoustic signal and the reflected signal is received by the H/RU at 92-B and the transmitted signal is received by the H/RU at 90-A where the received signals are in combination with the leak acoustic signal 84. Using all four modalities to assess the pipeline for anomalous events exploits the asymmetric characteristics of the water distribution network between the H/RUs and thereby improves the detection, identification and location estimation.

Acoustic signals have long been used for imaging with pattern recognition techniques employed to implement decision processing. The Hydro-RAT implements a similar approach where a feature set is extracted from the acoustic signals from the relevant H/RU measurements. Detection and identification of an anomalous event is determined by comparing the extracted feature set to exemplars based on employing a standard pattern recognition technique. Location of the anomalous event can be estimated based on timing information extracted from the feature set in conjunction with the estimated acoustic wave propagation speed within the pipeline. Anomalous events need to be separable from known events such as branches within a pipeline and separable from each other based on the feature set. The set of anomalous events which can be detected and uniquely identified based on the Hydro-RAT assessment are the following:

Leaks in pipelines
Tuberculated pipeline sections
Partially closed or fully closed valve gates
Variations in fluid homogeneity, e.g., air pockets within the water distribution network
Pipe wall structural degradation
Biofilm accumulation
Deviation from the utility's as-built pipeline network plans, e.g., unknown branches, unknown valves, and/or other unknown structural features.

Figure 6:
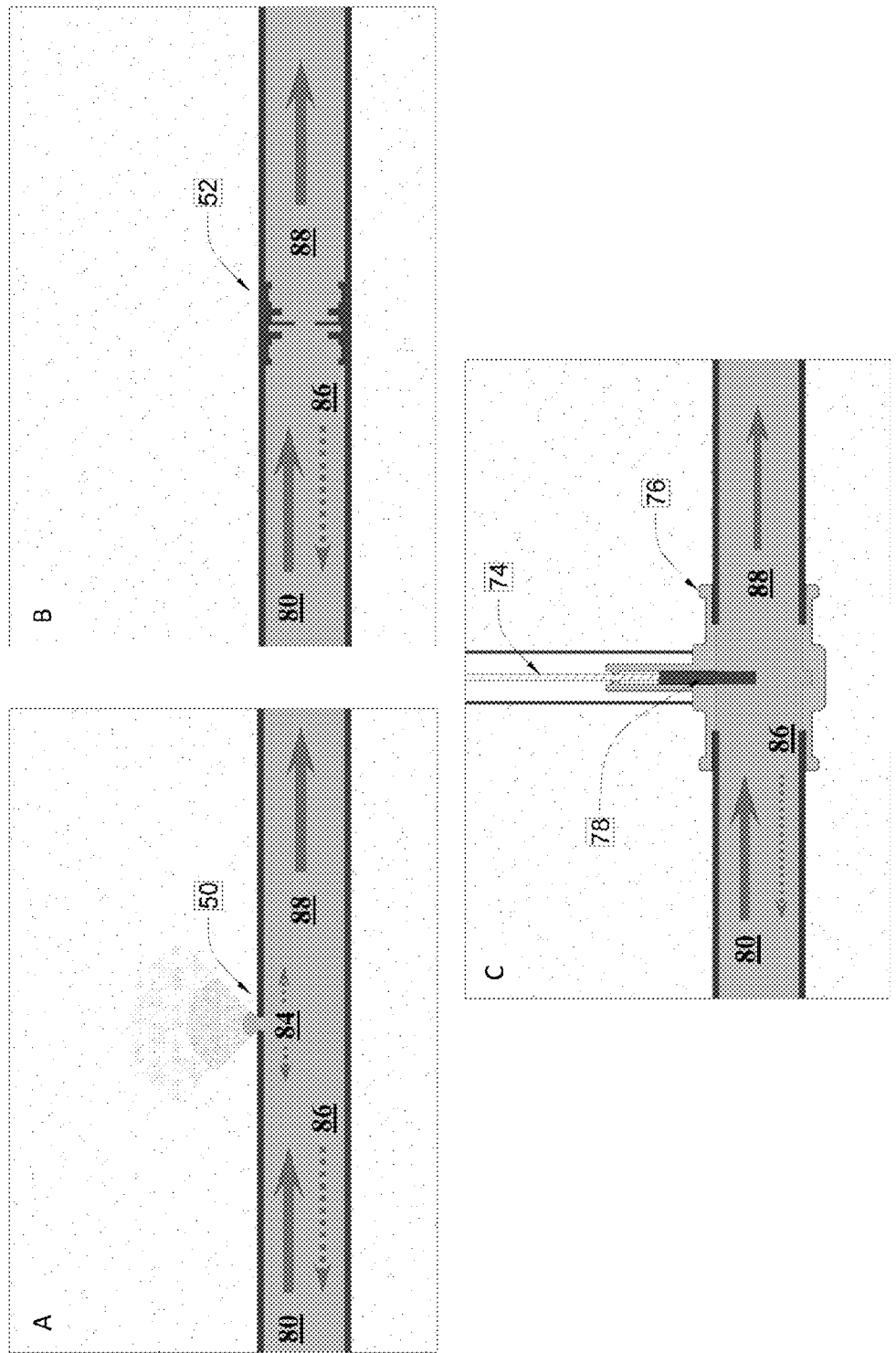
FIG. 6. is a schematic diagram illustrating exemplary embodiments of the acoustic signal characteristics under three different anomalous events within a pipeline (A) Fluid leak due to a pipeline break/rupture, (B) Tuberculated pipeline section, (C) Valve gate incorrectly set at 40% closed.

Referring to FIG. 6, this figure illustrates conceptually the characteristics of the acoustic signal under three different anomalous events: fluid leak due to a pipeline break/rupture, tuberculated pipeline section, and a partially closed valve gate.

The received acoustic signal under a pipeline leak anomaly, FIG. 6 A, was discussed previously. Under this condition, both the reflected and transmitted signal received at the H/RU will be combined with the acoustic signal generated by the leak. This combination provides an acoustic signature enabling the event to be uniquely detected and identified as a leak.

In FIG. 6 B, the pipeline anomalous event is a tuberculated pipe section 52. The tuberculated pipe section causes an impedance mismatch causing a reflection 86 and transmission 88 of the transmitted acoustic wave 80 from the transmitting H/RU. The surface of the tuberculated pipe section is highly uneven and rough. The tuberculated pipe section characteristics result in frequency dependent scattering of a broad spectrum acoustic wave. This dispersal pattern can be detected at the receiving H/RUs within both the reflection 86 and transmission 88 signals. These received acoustic signatures enable the event to be uniquely detected and identified as a tuberculated pipe section.

In FIG. 6 C, the valve gate 78 is 40% closed. Under this gate position, the characteristics of the transmitted acoustic signal 88 and reflected acoustic signal 86 resulting from the transmission of the H/RU generated acoustic signal 80 are governed by a superposition of Snell's law and Huygens-Fresnel principle of wave propagation, to a first order approximation. The transmitted acoustic signal 88 results from the refraction of the acoustic wave at both boundaries of the valve gate 78 based on the percentage of the gate's surface area that is within the pipe. Due to the variation in the velocity of sound in water versus the velocity in the gate, a signification portion of the signal is reflected versus refracted through the gate based on the percentage of the gate's surface area that is within the pipe. In addition, the received transmitted acoustic signal 88 will contain secondary waves generated within the gate opening. The characteristics of these secondary waves will be dependent on the valve position state, i.e., percent valve closure. Using the Hydro-RAT for valve position state estimation is discussed in greater detail in the provisional patent filed by Howitt [55].

Anomalous events due to variations in the fluid homogeneity within the pipeline will result in distinct acoustic signatures within the reflected and transmitted received acoustic wave. One example is air pockets within a water distribution system. In this embodiment, the fluid transported by the pipeline is essentially water and in larger diameter pipes air pockets can form. The air pockets result in an impedance mismatch to an acoustic wave traveling within the water. The received acoustic signatures enable the event to be uniquely detected and identified as an air pocket within the pipe section.

Structural features within a pipeline segment, e.g., branches, valves, etc., will result in distinct acoustic signatures within the received acoustic waves from both the reflected and transmitted signals. These acoustic signatures can be used to derive a mapping of the pipeline network. By comparing the derived mapping with the utility's as-built pipeline network plans, unknown structural features can be detected and identified.

Estimating the location of an anomalous event within a pipeline is provided by the Hydro-RAT. The location estimation, $\hat{L}$, is based on determining the relative time of the anomaly within the reflected signal, $\tau_{o|f}$, and estimating the propagation speed of the acoustic signal within the pipe segment, $\hat{s}(f)$. The anomaly location is given by $$\hat{L}(f) = \hat{s}(f) \times \tau_{o|f}$$

where the propagation speed is frequency (f) dependent. By using a structured acoustic wave transmission 80, the relative timing within the received reflected acoustic signal 86 can be evaluated.

As presented in the background section, the acoustic signal propagation speed is dependent on site specific characteristics and for reliable anomaly location estimation, the propagation speed needs to be estimated for each pipe segment. One embodiment for obtaining this estimation is based on using the received transmitted signal 88. By using a common reference clock between the transmitting H/RU and the receiving H/RU, the absolute time required for the acoustic signal to transverse the pipe segment with known length d can be estimated, $\tau_{d|f}$, and by using a structured acoustic wave transmission 80, the absolute timing within the received transmitted acoustic signal 88 can be evaluated based on frequency. The frequency dependent propagation speed can be estimated by $$\hat{s}(f) = \frac{\tau_{d|f}}{d}.$$

The anomaly location can be refined by averaging over frequency $$\hat{L} = \sum_f \hat{L}(f).$$

The anomaly location can be further refined by evaluating acoustic signal propagation speed within subsections of the pipe segments. This is achieved by using location information for known structural features within the pipe segments.

A subsection propagation speed can be evaluated by using the location information in conjunction with the timing difference between the reception of the known structural features within the received active transmission.

Building on the previous discussion outlining the signal characteristics, each water pipeline section can be viewed as a linear time invariant system over a sufficiently short time interval. This approximation is based on the dynamics of the water flow and that variations in the pipeline occur slowly. Therefore the pipeline impulse response, h(t), between two deployed H/RUs will be statistically invariant over a limited time interval.

Figure 7:
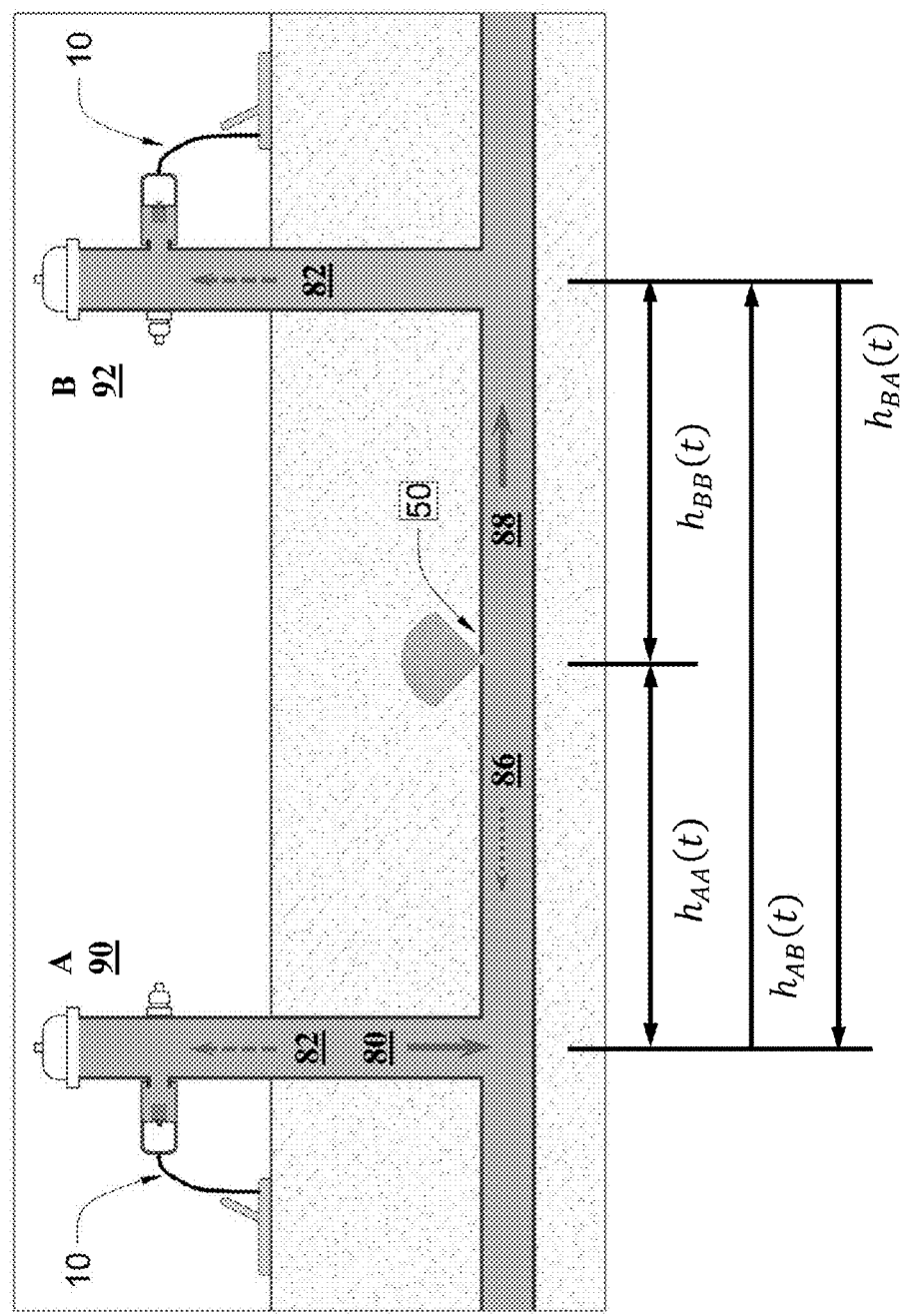
FIG. 7. is a schematic diagram illustrating two port analysis for evaluating pipeline section condition assessment based on the Hydro-RAT operation with multiple H/RUs.

FIG. 7 illustrates an embodiment which exemplifies one method for obtaining a feature set used in detecting, identifying and locating anomalous events within a pipe segment. For this embodiment, H/RUs are deployed at fire hydrants 90-A and 92-B. Upon testing the pipe segment between the two H/RUs, the measured transmitted and reflected acoustic signals are used to estimate the corresponding impulse response. The feature set is then the set of estimated impulse responses, $\{\hat{h}_{AA}(t), \hat{h}_{AB}(t), \hat{h}_{BA}(t), \hat{h}_{BB}(t)\}$. Location estimation requires a common reference clock (e.g., GPS) to set and maintain synchronization between the H/RUs. Then, as part of the feature set, the absolute time is recorded for each time sample within each impulse response. The feature set provides a two port analysis for each water pipeline section which can be used in evaluating the water distribution/transmission network using classical network theory and pattern classification approaches.

Figure 8:
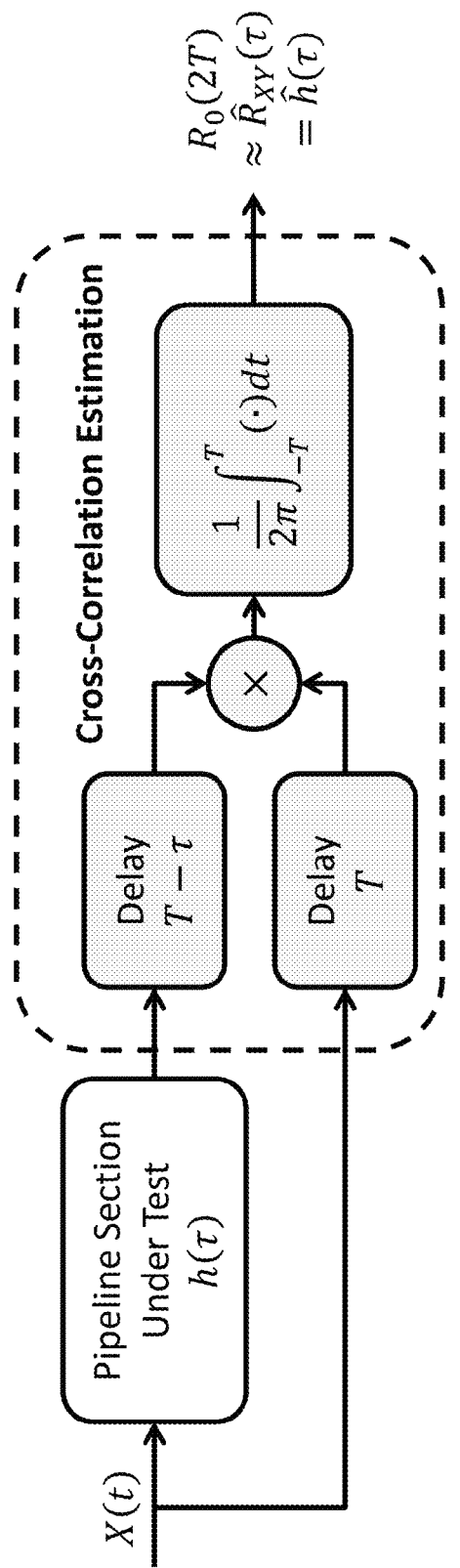
FIG. 8. is a block diagram illustrating an exemplary method for estimating the pipeline section impulse response using a cross-correlation approach.

Various approaches are available for estimating the impulse response for a water pipeline section based on the acoustic signal transmission or reflection [56] [57] [58] [59]. One approach is depicted in FIG. 8, where the acoustic signal transmitted at the source H/RU, X(t), is a maximum length sequence (MLS). An MLS is a pseudo-random sequence with an approximate constant power spectral density and an auto correlation of $$R_{XX}(\tau) \approx \frac{N_0}{2} \delta(\tau).$$

Using the MLS sequence, the estimated impulse response of the water pipeline section under test, i.e., the water pipeline section between the H/RU Acoustic Generator and H/RU Acoustic Sensor is $$h(\tau) \approx \hat{h}(\tau) = \hat{R}_{XY}(\tau) \approx \frac{1}{2\pi} \int_{-T}^{T} x(t) y(t + \tau) dt$$

given T is sufficiently large and the impulse response is stationary over the interval 2T.

Figure 9:
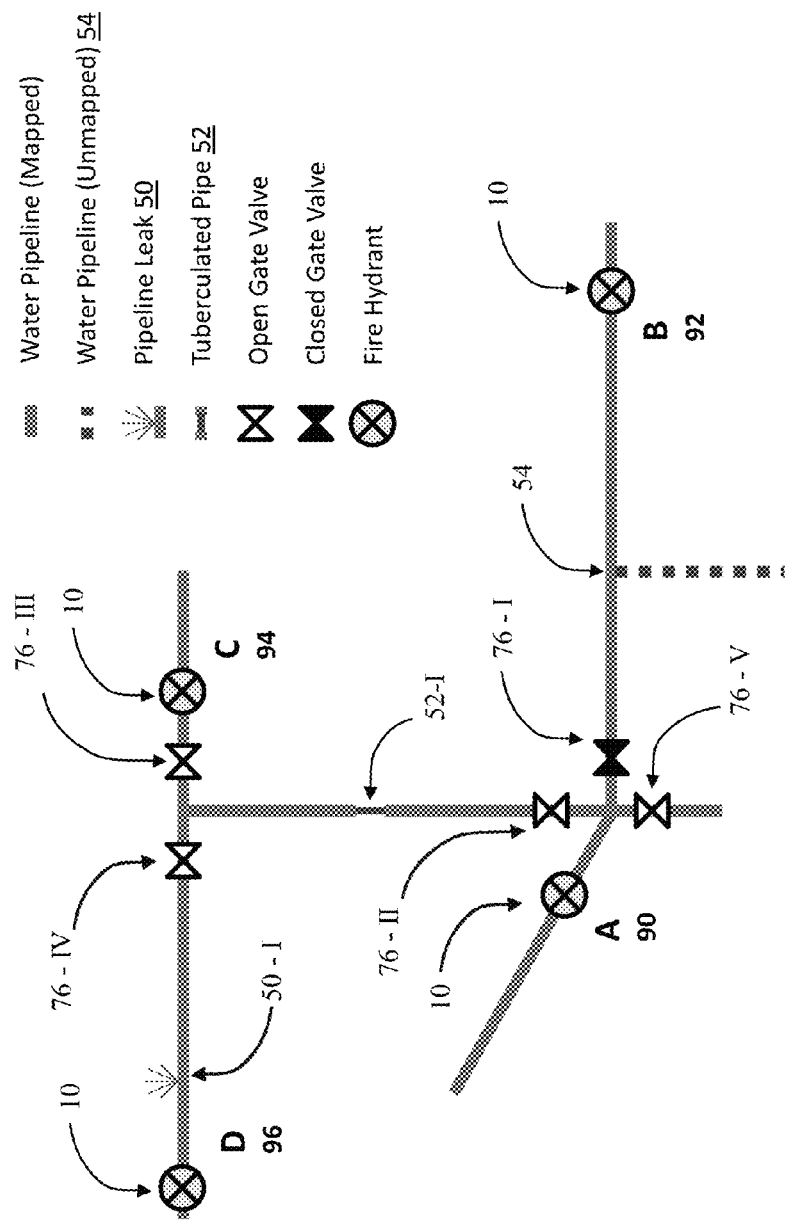
FIG. 9. is a block diagram illustrating an exemplary method for implementing the Hydro-RAT based on multiple H/RU deployments with pipeline network to detect, classify and locate anomalous events within the network.

Referring to FIG. 9, the graphic depicts an embodiment of a method for implementing the Hydro-RAT within a water distribution network. The embodiment is based on H/RUs deployed at the four fire hydrants: 90-A, 92-B, 94-C, and 96-D with the goal of detecting, identifying and locating anomalous events within the connecting pipe segments.

To provide a spatial context for valve and hydrant placement within a water distribution/transmission network, the standards and specifications for the Charlotte-Mecklenburg utilities is summarized [60]. Maximum spacing between isolation valves is 1500' in the distribution network and 3000' in transmission lines. Two valves are required at each tee connection and three valves at each cross connection.

Fire hydrant spacing is specified by the NC DHS which requires hydrants within a radial distance of 1000' from each residence and 500' from each business.

The two port analysis between each pair of H/RUs can occur essentially concurrently by simultaneously deploying four H/RUs at each fire hydrant. For the implementation illustrated in FIG. 9, this results in six two-port analyses with each two-port analysis having a corresponding feature set. These feature sets are jointly evaluated and harmonized in order to detect, identify and locate anomalous events within the connecting pipe segments. Each two-port analysis is conducted using the techniques illustrated in FIGS. 7 and 8. Alternatively, due to the stationary characteristics of the water distribution network over short time intervals, the two port analysis can be conducted pairwise. For the pairwise deployment approach, the H/RUs are deployed systematically to evaluate each water pipeline segment to be tested. In the case illustrated in FIG. 9, a set of two port analyses conducted between, e.g., {90-A to 92-B, 90-A to 94-C, 94-C to 96-D} is sufficient for evaluating the pipe segments. Augmenting the results with additional feature sets from the other three possible two-port combinations {90-A to 96-D, 92-B to 94-C, 92-B to 96-D} can further enhance the assessment process.

One embodiment of the Hydro-RAT operation involves the following general steps for obtaining an assessment for either one or multiple pipeline segments.

Step I: Time Synchronization.

The H/RU units are time synchronized to a common reference clock such as GPS. Synchronization tolerance requirement is driven by the maximum acceptable location estimation error.

Step II: Passive Mode & Pairwise Correlation.

The H/RU units are simultaneously placed in receive mode with no active projector. Received signals at the H/RU units 10 will be comprised of leak induced signals 84 and other noise sources within the pipe segment. Pairwise correlation between H/RU unit measurements allows for stochastically modeling the noise and/or leak signal within the pipe segment.

Step III: Round Robin Active Mode & Pairwise Correlation

Using a round robin protocol, each H/RU unit pair assesses the connecting pipe segment using active acoustic assessment where one H/RU Acoustic Generator actively transmits a structured acoustic signal while the other H/RU Acoustic Sensor is receiving. Pairwise correlation between H/RU unit measurements allows for obtaining the feature sets used in the detection, identification and location of anomalous events within the pipeline segments. Effects of ambient noise within the pipeline segments are mitigated by using the results obtained from Step II in conjunction with standard statistical signal processing tools such as a matched filter or Kalman filters.

Step IV: Measurement Harmonization & Assessment:

All measurement data obtained from both passive and active modes are combined in conjunction with GIS data for the pipeline network and/or historical H/RU measurements (when available) in order to assess the pipeline segment investigated for anomalous events. Multiple measurements conducted for the same pipeline are harmonized and are used to reduce uncertainty in the assessment process.

Although the present invention is illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention, are contemplated thereby, and are intended to be covered by the claims that follow.

REFERENCES

[1] K. Baik, J. Jiang and T. Leighton, "Acoustic attenuation, phase and group velocities in liquid-filled pipes: Theory, experiment and examples of water and mercury," *Journal of the Acoustic Society of America*, vol. 128, no. 5, pp. 2610-2624, 2010.

[2] L. Lafleur and F. D. Shields, "Low-frequency propagation modes in a liquid-filled elastic tube waveguide," *Journal of the Acoustic Society of America*, vol. 97, no. 3, pp. 1435-1445, 1995.

[3] R. Long, P. Cawley and M. Lowe, "Acoustic wave propagation in buried iron water pipes," *Mathematical, Physical and Engineering Sciences*, vol. 459, pp. 2749-2770, 2003.

[4] Z. Liu, Y. Kleiner, B. Rajani, L. Wang and W. Condit, "Condition Assessment Technologies for Water Transmission and Distribution Systems," National Risk Management Research Laboratory, Office of Research and Development, U.S. Environmental Protection Agency, Cincinnati, Ohio, 2012.

[5] R. G. Acevedo, A. L. Méndez, E. Á. Álvarez, S. G. Suárez, M. R. Lastra and A. G.-T. Gutiérrez-Trashorras, "Acoustic Communications in Water Pipes: An Experimental Approach," in 1*st International Congress water, waste and energy management*, Salamanca, Spain, 2012.

[6] G. Kikossalakis, "Acoustic data communication system for in-pipe wireless sensor networks," Doctor of Science in Civil and Environmental Engineering, Massachusetts Institute of Technology, 2006.

[7] G. Kokosalakis, A. M. Gorlov, E. Kausel and A. J. Whittle, "Communications and power harvesting system for in-pipe wireless sensor networks". U.S. Pat. No. 7,835,226 B2, 16 Nov. 2010.

[8] V. Havlena, "Communication for water distribution networks". U.S. Pat. No. 6,626,042 B2, 30 Sep. 2003.

[9] L. P. I. Martin and J. Cooper, "Acoustic system for communication in pipelines". U.S. Pat. No. 7,423,931 B2, 9 Sep. 2008.

[10] J. Cooper and A. Burnham, "Sensor and transmitter system for communication in pipelines". U.S. Pat. No. 8,362,919 B2, 29 Jan. 2013.

[11] D. A. Greene, R. A. Greene and D. C. Gaubatz, "Integrated acoustic leak detection processing system". U.S. Pat. No. 5,533,383, 9 Jul. 1996.

[12] G. S. Chana, "Method and system for localizing and correlating leaks in fluid conveying conduits". U.S. Pat. No. 6,530,263 B1, 11 Mar. 2003.

[13] H. Kurisu, T. Sekozawa, S. Shimauchi and M. Yoda, "Pipeline breakage sensing system and sensing method". U.S. Pat. No. 5,708,195, 13 Jan. 1998.

[14] P. S. W. E. Lander, "Method for detecting leaks in pipelines". U.S. Pat. No. 5,974,862, 2 Nov. 1999.

[15] P. S. W. E. Lander, "Monitoring vibrations in a pipeline network". U.S. Pat. No. 6,567,006 B1, 20 May 2003.

[16] P. Lander, "Tracking vibrations in a pipeline network". U.S. Pat. No. 6,957,157 B2, 18 Oct. 2005.

[17] D. B. Chang, "Leak detector for natural gas pipelines". U.S. Pat. No. 5,117,676, 2 Jun. 1992.

[18] M. Savic, "Detection of leaks in pipelines". U.S. Pat. No. 5,416,724, 16 May 1995.

[19] T. Suzuki, S. Taniguchi, K. Kanemaru, Y. Sato and A. Enamito, "Method and apparatus for detecting the position of an abnormal site of a buried pipe". U.S. Pat. No. 5,544,074, 6 Aug. 1996.

[20] O. Hunaidi, "PC multimedia-based leak detection system for water transmission and distribution pipes". U.S. Pat. No. 6,453,247, 17 Sep. 2002.

[21] A. A. Bseisu, J. E. Kingman and H. M. Cornette, "Acoustic vibration detection of fluid leakage from conduits". U.S. Pat. No. 5,038,614, 13 Aug. 1991.

[22] R. A. Roberts, L. E. Rewerts and M. A. Clark, "Method and apparatus for determining source location of energy carried in the form of propagating waves through a conducting medium". U.S. Pat. No. 6,138,512, 31 Oct. 2000.

[23] B.-W. Yang and M. Recane, "Method and apparatus for pattern match filtering for real time acoustic pipeline leak detection and location". U.S. Pat. No. 6,389,881 B1, 21 May 2002.

[24] P. O. Paulson, "Pipeline monitoring system". US Patent 2006/0225507 A1, 12 Oct. 2006.

[25] B.-W. Yang, E. Yang, M. Recane and S. Yang, "Integrated acoustic leak detection system using intrusive and non-intrusive sensors". U.S. Pat. No. 8,346,492 B2, 1 Jan. 2013.

[26] M. Joel and S. Pascal, "Method for detecting and locating at least one source of noise in a pipe transporting a fluid and installation therefor". US Patent Application WO2004031719 A1, 15 Apr. 2004.

[27] S. Lapinski, D. Alphenaar and S. Olson, "Method and system for determining the direction of fluid flow". U.S. Pat. No. 7,376,522 B2, 20 May 2008.

[28] M. Okada, S. Magashima, K. Nakamachi, K. Hattori, Y. Tankanashi, M. Yasuda, M. Ishikawa and Y. Muratat, "Abnormality monitoring apparatus for a pipeline". U.S. Pat. No. 5,333,501, 2 Aug. 1994.

[29] A. P. Russo, "Underground conduit defect localization". U.S. Pat. No. 5,531,099, 2 Jul. 1996.

[30] W. L. K. Worthington Henry W., "System of autonomous sensors for pipeline inspection". U.S. Pat. No. 5,987,990, 23 Nov. 1999.

[31] P. O. Paulson, "Pipeline monitoring array". U.S. Pat. No. 6,082,193, 4 Jul. 2000.

[32] P. Martinek, "Method and measurement probe for the performance of measurements in water supply systems". U.S. Pat. No. 7,007,545 B1, 7 Mar. 2006.

[33] M. N. T. K. Bassim, "Apparatus for continuous long-term monitoring of acoustic emission". U.S. Pat. No. 4,609,994, 2 Sep. 1986.

[34] P. S. Allison, C. E. Chassaing and B. Lethcoe, "Acoustic impact detection and monitoring system". U.S. Pat. No. 7,607,351 B2, 27 Oct. 2009.

[35] H. Haines and R. V. Francini, "In-ground pipeline monitoring". U.S. Pat. No. 6,614,354 B2, 2 Sep. 2003.

[36] M. G. Dalmazzone, L. G. De and G. Giunta, "System and method for the continuous detection of impacts on pipelines for the transportation of fluids, particularly suitable for underwater pipelines". US Patent Application WO2011039589 A1, 7 Apr. 2011.

[37] R. R. Staton and W. O. Peck, "Horizontal boring pipe penetration detection system and method". U.S. Pat. No. 5,457,995, 17 Oct. 1995.

[38] G. H. Piesinger, "Method of finding faults in a branched electrical distribution circuit". U.S. Pat. No. 5,369,366, 29 Nov. 1994.

[39] M. Fink, J. De la Gorgue de Rosny, C. Julia-Prada and T. Folegot, "Method of determining impulse responses from a medium in relation to the transmission of waves between different points". U.S. Pat. No. 7,656,748 B2, 2 Feb. 2010.

[40] B. Hartley, "Method of producing continuous orthogonal signals and method of their use for detecting changes in a body". U.S. Pat. No. 6,813,566 B2, 2 Nov. 2004.

[41] H. L. Ledeen, R. J. Bating and C. R. Hastings, "System and method for locating release of fluid from a pipeline". U.S. Pat. No. 5,708,193, 13 Jan. 1998.

[42] M. N. Shamout, J. T. Turner, B. Lennox and D. Smith, "Remote pipeline acoustic inspection". U.S. Pat. No. 7,266,992 B2, 11 Sep. 2007.

[43] J. Baumoel, "Leak locator for pipe systems". U.S. Pat. No. 6,442,999 B1, 3 Sep. 2002.

[44] J. D. Hill and M. Mcewen-King, "Conduit monitoring". US Patent Application 2010020796 A1, 25 Feb. 2010.

[45] I. Howitt, "Monitoring systems and methods for sewer and other conduit systems". U.S. Pat. No. 8,220,484, 17 Jul. 2012.

[46] S. Mizushina, A. Adachi and T. Fujiwara, "Method of estimating location of abnormality in fluid feed pipeline network". U.S. Pat. No. 6,912,472, 28 Jun. 2005.

[47] A. Peleg, A. Armon, U. Barkay, H. Scolnicov and S. Gutner, "System and method for monitoring resources in a water utility network". U.S. Pat. No. 7,920,983 B1, 5 Apr. 2011.

[48] H. Scolnicov, A. Armon, C. Linhart, L. Bien and N. Petrank, "System and method for identifying related events in a resource network monitoring system". U.S. Pat. No. 8,341,106 B1, 25 Dec. 2012.

[49] F. Wakamori, H. Ohata, S. Miyaoka and M. Funabashi, "Method of estimating fracture point of pipe line network". U.S. Pat. No. 4,712,182, 8 Dec. 1987.

[50] E. Farmer, "System for monitoring pipelines". U.S. Pat. No. 4,796,466, 10 Jan. 1989.

[51] K. E. Abhulimen and A. A. Susu, "Realtime computer assisted leak detection/location reporting and inventory loss monitoring system of pipeline network systems". U.S. Pat. No. 6,970,808 B2, 29 Nov. 2005.

[52] R. Guidi and S. Tedeschi, "Method for detecting and reporting leaks of fluid in distribution networks, particularly in condominium water or gas distribution networks and apparatus for performing the method". US Patent 2007/0288200 A1, 13 Dec. 2007.

[53] A. Yukawa, K. Yokokawa and N. Oishi, "Water leakage monitoring system". U.S. Pat. No. 8,072,340 B2, 6 Dec. 2011.

[54] T. L. Greenlee, N. W. Anderson and E. F. Jacob, "System and method for leak detection based upon analysis of flow vectors". U.S. Pat. No. 7,418,354 B1, 26 Aug. 2008.

[55] I. Howitt, "Method and apparatus for valve position state estimation". U.S. Patent Provisional Patent 61/870, 279, 27 Aug. 2013.

[56] D. D. Rife and J. Vanderkooy, "Transfer-Function Measurement with Maximum-Length Sequences," *Journal of the Audio Engineering Society*, vol. 37, no. 6, 1989.

[57] J. Vanderkooy, "Aspects of MLS Measuring Systems," *Journal of the Audio Engineering Society*, vol. 42, no. 4, 1994.

[58] M. Wright, "Comments on 'Aspects of MLS Measuring Systems," *Journal of the Audio Engineering Society*, vol. 43, no. 1, 1995.

[59] M. Muller, "Transfer-Function Measurement with Sweeps," *Journal of Audio Engineering Society*, vol. 49, no. 6, 2001.

[60] "Water and Sewer Policies, Procedures, Standards and Specifications," Charlotte-Mecklenburg Utility Department, 1995.

What is claimed is:

1. A method for detecting and identifying an event representing a failure mode and/or a precursor to a failure mode within a pipeline segment or network, comprising:
   using an acoustic sensor acoustically coupled to the pipeline segment or network, detecting a passive acoustic signal from the pipeline segment or network;
   using an acoustic transmitter acoustically coupled to the pipeline segment or network, transmitting an active acoustic signal to the pipeline segment or network subsequent to the acoustic sensor detecting the passive acoustic signal from the pipeline segment or network;
   using the same or a different acoustic sensor acoustically coupled to the pipeline segment or network, detecting the active acoustic signal from the pipeline segment or network; and
   processing both the passive acoustic signal and the active acoustic signal to characterize an anomaly within the pipeline segment or network.

2. The method of claim 1, wherein the detected active acoustic signal is one or more of a transmitted active acoustic signal and a reflected active acoustic signal.

3. The method of claim 1, wherein the passive acoustic signal is processed to reduce the effects of ambient noise on the characterization of the anomaly using the active acoustic signal.

4. The method of claim 1, wherein the acoustic transmitter and the acoustic sensor are disposed in a plurality of acoustic transducers.

5. The method of claim 4, wherein at least one acoustic transducer is located upstream of the anomaly and at least one acoustic transducer is located downstream of the anomaly.

6. The method of claim 1, wherein the active acoustic signal comprises a structured active acoustic signal.

7. The method of claim 1, wherein each of the acoustic sensors comprises one of hydrophone and an accelerometer.

8. The method of claim 1, wherein the acoustic transmitter comprises one of a projector, a tapping machine, and a water jet.

9. The method of claim 1, wherein processing both the passive acoustic signal and the active acoustic signal comprises synching a plurality of acoustic transducers with respect to time and data.

10. The method of claim 1, further comprising further characterizing the anomaly within the pipeline segment or network using geographic information system (GIS) information.

11. The method of claim 1, further comprising further characterizing the anomaly within the pipeline segment or network using a historical characterization of the pipeline segment or network.

12. A system for detecting and identifying an event representing a failure mode and/or a precursor to a failure mode within a pipeline segment or network, comprising:
   an acoustic sensor acoustically coupled to the pipeline segment or network for detecting a passive acoustic signal from the pipeline segment or network;
   an acoustic transmitter acoustically coupled to the pipeline segment or network for transmitting an active acoustic signal to the pipeline segment or network subsequent to the acoustic sensor detecting the passive acoustic signal from the pipeline segment or network;
   the same or a different acoustic sensor acoustically coupled to the pipeline segment or network for detecting the active acoustic signal from the pipeline segment or network; and
   a processor for processing both the passive acoustic signal and the active acoustic signal to characterize an anomaly within the pipeline segment or network.

13. The system of claim 12, wherein the detected active acoustic signal is one or more of a transmitted active acoustic signal and a reflected active acoustic signal.

14. The system of claim 12, wherein the passive acoustic signal is processed to reduce the effects of ambient noise on the characterization of the anomaly using the active acoustic signal.

15. The system of claim 12, wherein the acoustic transmitter and the acoustic sensor are disposed in a plurality of acoustic transducers.

16. The system of claim 15, wherein at least one acoustic transducer is located upstream of the anomaly and at least one acoustic transducer is located downstream of the anomaly.

17. The system of claim 12, wherein the active acoustic signal comprises a structured active acoustic signal.

18. The system of claim 12, wherein each of the acoustic sensors comprises one of hydrophone and an accelerometer.

19. The system of claim 12, wherein the acoustic transmitter comprises one of a projector, a tapping machine, and a water jet.

20. The system of claim 12, wherein processing both the passive acoustic signal and the active acoustic signal comprises synching a plurality of acoustic transducers with respect to time and data.

21. A method for detecting, identifying and locating an event representing a failure mode and/or a precursor to a failure mode within a pipeline segment or network, comprising:
   providing a first acoustic transducer coupled to the pipeline segment or network on one side of an anomaly;
   providing a second acoustic transducer coupled to the pipeline segment or network on another side of the anomaly;
   using the first acoustic transducer to detect a passive acoustic signal from the pipeline segment or network;
   using the first acoustic transducer to transmit an active acoustic signal to the pipeline segment or network subsequent to the first acoustic transducer detecting the passive acoustic signal from the pipeline segment or network;
   using the first acoustic transducer to detect a reflected active acoustic signal from the pipeline segment or network;
   using the second acoustic transducer to detect the transmitted active acoustic signal from the pipeline segment or network; and
   processing the passive acoustic signal, the reflected active acoustic signal, and the transmitted active acoustic signal to characterize an anomaly within the pipeline segment or network.

22. The method of claim 21, further comprising synching the first acoustic transducer and the second acoustic transducer with respect to time and data.

23. The method of claim 21, further comprising further characterizing the anomaly within the pipeline segment or network using geographic information system (GIS) information.

24. The method of claim 21, further comprising further characterizing the anomaly within the pipeline segment or network using a historical characterization of the pipeline segment or network.

\* \* \* \* \*